(12) United States Patent
Marrot et al.

(10) Patent No.: US 9,120,935 B2
(45) Date of Patent: Sep. 1, 2015

(54) HYDROSILYLATION REACTION INHIBITORS, AND USE THEREOF FOR PREPARING STABLE CURABLE SILICONE COMPOSITIONS

(75) Inventors: Sébastien Marrot, Lyons (FR); Yassine Maadadi, Meyzieu (FR)

(73) Assignee: BLUESTAR SILICONES FRANCE SAS, Lyon (FR)

( * ) Notice: Subject to any disclaimer, the term of this patent is extended or adjusted under 35 U.S.C. 154(b) by 0 days.

(21) Appl. No.: 14/128,414

(22) PCT Filed: Jun. 19, 2012

(86) PCT No.: PCT/FR2012/000249
§ 371 (c)(1),
(2), (4) Date: May 9, 2014

(87) PCT Pub. No.: WO2012/175825
PCT Pub. Date: Dec. 27, 2012

(65) Prior Publication Data
US 2014/0329099 A1 Nov. 6, 2014

(30) Foreign Application Priority Data
Jun. 21, 2011 (FR) .................................... 11 01918

(51) Int. Cl.
| | |
|---|---|
| *C09D 183/04* | (2006.01) |
| *C09D 7/12* | (2006.01) |
| *C08K 13/02* | (2006.01) |
| *C08K 5/05* | (2006.01) |
| *C08K 5/42* | (2006.01) |
| *C08L 83/04* | (2006.01) |
| *C09K 15/12* | (2006.01) |
| *B32B 27/28* | (2006.01) |
| *C08G 77/12* | (2006.01) |
| *C08G 77/20* | (2006.01) |

(52) U.S. Cl.
CPC ................ *C09D 7/1233* (2013.01); *C08K 5/05* (2013.01); *C08K 5/42* (2013.01); *C08K 13/02* (2013.01); *C08L 83/04* (2013.01); *C09D 183/04* (2013.01); *C09K 15/12* (2013.01); *B32B 27/283* (2013.01); *C08G 77/12* (2013.01); *C08G 77/20* (2013.01); *C08L 2205/02* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 5,041,594 | A * | 8/1991 | Herzig ........................... | 556/450 |
| 5,496,906 | A | 3/1996 | Jeram et al. | |
| 2005/0282453 | A1 | 12/2005 | Jackson et al. | |
| 2006/0016695 | A1* | 1/2006 | Richter et al. ................. | 205/450 |
| 2006/0247450 | A1* | 11/2006 | Wu et al. ........................ | 549/299 |
| 2007/0167563 | A1 | 7/2007 | Cray et al. | |
| 2007/0191468 | A1* | 8/2007 | Nishi et al. .................... | 514/427 |
| 2009/0208660 | A1 | 8/2009 | Guennouni et al. | |

FOREIGN PATENT DOCUMENTS

KR     20100058307 A     6/2010

OTHER PUBLICATIONS

International Search Report issued Sep. 11, 2012, by the European Patent Office as the International Searching Authority in International Patent Application No. PCT/FR2012/000249, 3 pages.

* cited by examiner

*Primary Examiner* — Marc Zimmer
(74) *Attorney, Agent, or Firm* — Dentons US LLP

(57) ABSTRACT

Methods of using inhibitor compounds are described. In particular, methods of using inhibitor compounds to inhibit the curing of a silicone composition that is a precursor of a silicone elastomer produced by a hydrosilylation reaction are described.

27 Claims, No Drawings

HYDROSILYLATION REACTION INHIBITORS, AND USE THEREOF FOR PREPARING STABLE CURABLE SILICONE COMPOSITIONS

CROSS-REFERENCE TO PRIOR APPLICATIONS

This application is a National Stage of PCT/FR2012/000249, filed Jun. 19, 2012, and designating the U.S. (published in French on Dec. 27 2012, as WO 2012/175825A1), which claims priority under 35 U.S.C. §119 to FR 11/01918, filed Jun. 21, 2011, each hereby expressly incorporated by reference in its entirety and each assigned to the assignee hereof.

The present invention relates to the use of inhibitor compounds, in particular of inhibitor compounds suitable for inhibiting the curing of a silicone composition that is a precursor of a silicone elastomer obtained by means of a hydrosilylation reaction.

When it is necessary to increase the pot life of addition-curable organopolysiloxane compositions, or to provide a single-component addition-curable organo-polysiloxane composition, it is standard to incorporate a curing inhibitor. Curing inhibitors are compounds which slow down the curing at ambient temperatures but which do not delay the curing at higher temperatures. These curing inhibitors are sufficiently volatile to be driven off from coating compositions.

It is known practice, see for example U.S. Pat. No. 3,445,420, to use acetylenic compounds such as acetylenic alcohols with a boiling point of less than 250° C., in particular 2-methyl-3-butyn-2-ol and ethynyl-cyclohexanol, as hydrosilylation inhibitors in curable silicone compositions based on an organosiliceous polymer bearing substituents having olefinic unsaturation (in particular vinylic unsaturation), on an organohydrosiloxane polymer and on a catalyst of the platinum or platinum compound type.

The presence of these acetylenic compounds inhibits the platinum catalyst by preventing it from catalyzing the curing reaction at ambient temperature, but not at high temperature. Indeed, curable silicone compositions which contain this type of inhibitor can be cured by increasing the temperature of the composition to a temperature above the boiling point or sublimation point of the inhibitor, thus evaporating the inhibitor or a portion of the inhibitor, and allowing the catalyst to catalyze the hydrosilylation reaction and, consequently, to cure the silicone composition.

The usefulness of these inhibitor compounds is acknowledged and makes it possible to transport the compositions in a single packaging instead of two. They can also be used to prolong the processing time or the pot life, in comparison with compositions not containing the acetylenic compound.

These compositions can be deposited on supports such as paper, by coating for example, and thermally cured at a temperature of about 80 to 250° C., in particular between 100 and 220° C., see for example patents FR-A-1 528 464 and FR-A-2 372 874.

These compositions have the drawback, for the preparation of non-stick coatings, of not being able to crosslink on the support at a temperature below 80° C. and of having insufficient stability during machine coating, since gelling of the coating bath is already seen after one hour. This is due to the fact that these inhibitors are sublimable. This major drawback means that they have to be used in large amounts, which is reflected by strong inhibition of the activity of the platinum and, consequently, a slowing of the crosslinking speed, which makes it necessary to reduce coating rates.

It should be noted that the reference U.S. Pat. No. 5,496,906 describes an acid pretreatment of a filler used in a silicone composition in order to remove the nitrosamine derivatives during the formation of the elastomer after crosslinking. This filler is incorporated into a vinyl-containing silicone oil and is treated by heating at a temperature of between 70 and 80° C. for one hour in the presence of a vinyltriethoxysilane, water and an acid. When the chemical treatment has finished, the mixture undergoes a stripping step at 140° C. and under vacuum in order to remove all the by-products of the reaction (see example 1, column 6).

The reference US-2007/0167563 describes, in comparative example C1, the use of a trifluoromethanesulfonic acid as a catalyst in the preparation of a vinyl-containing polysiloxane comprising siloxyl units Q, from a tetra(dimethylvinylsiloxy)silane. Those skilled in the art will understand, on reading example 1, that the end of the reaction is followed by a neutralization step in order to avoid the presence of this acid.

It must therefore be noted that the prior technical proposals do not provide satisfactory solutions to the problem set out above.

One of the essential objectives of the present invention is to provide a novel inhibitor which does not have the drawbacks mentioned above.

Another essential objective of the present invention is to provide a silicone composition X with a low platinum content, i.e. having less than 50 ppm by weight of platinum relative to the total weight of the composition, and capable of curing by means of a polyaddition reaction, which:

- is stable for several hours so as to allow, for example, machine coating operations;
- rapidly crosslinks on a support at a curing temperature below 120° C.; and
- has great bath stability at 25° C. and 40° C.

Thus, the main subject of the invention consists of a silicone composition X capable of curing by means of a polyaddition reaction, comprising:

(1) at least one organopolysiloxane A comprising, per molecule, at least two alkenyl radicals bonded to silicon atoms, (2) at least one organohydropolysiloxane B comprising, per molecule, at least two hydrogen atoms bonded to silicon atoms, (3) at least one catalyst C which is a platinum compound and even more preferentially a Karstedt platinum, in which the amount by weight of platinum of the catalyst C relative to the total weight of the silicone composition X is less than 50 ppm and preferably between 1 and 40 ppm and even more preferentially between 5 and 25 ppm, (4) at least one inhibitor D which is capable of being obtained by mixing, optionally in situ:

at least one inhibitor D1 which is an acetylenic alcohol and preferably an α-acetylenic alcohol, and at least one acid D2 which has, in aqueous solution and at 25° C., at least one $pKa < -0.9$, preferably $\leq -1.0$ and even more preferentially included in the following range $-12.0 \leq pKa \leq -1.0$, said constituents D1 and D2 being initially present in said silicone composition X in amounts sufficient to:

maintain the inhibition of the catalyst C so as to prevent the formation of a gel or of an elastomer when said silicone composition X is stored at ambient temperature, and allow the partial or complete degradation of said acetylenic alcohol D1 by chemical reaction between the inhibitor D1 and the acid D2 when the silicone composition X is cured by heating at a temperature between 70° C. and 200° C.

The applicant has found, entirely unexpectedly, which is precisely the subject of the present invention, that, in silicone compositions capable of curing by means of a polyaddition reaction, which contain a low platinum content, i.e. which have amounts by weight of platinum of less than 50 ppm relative to the total weight of the composition, the use of an inhibitor D which is obtained by mixing, optionally in situ, a hydrosilylation inhibitor D1, which is an acetylenic alcohol, and a strong acid D2 which has, in aqueous solution at 25° C., at least a pKa<−0.9, makes it possible to obtain compositions:
- which are stable for several hours during machine coating operations,
- which crosslink rapidly on a support at a curing temperature below 120° C., and
- which have good bath stability at 25° C. and 40° C.

It should be noted that these results were obtained with low amounts by weight of platinum catalyst, i.e. less than 50 ppm by weight of platinum relative to the total weight of the composition.

Examples of acid D2 that are of use according to the invention are, for example, chosen from the group consisting of the following acids:
$H_2CrO_4$, HI, $HMnO_4$, $HNO_3$, $HReO_4$, $H_2SO_4$, $CF_3SO_3H$, $CH_3SO_3H$, HCl, HBr, $HClO_4$, $H_2SO_4$, $HNO_3$, $H_2CrO_4$, $HClO_3$ and HI.

According to another preferred embodiment, the acid D2 is chosen from the group consisting of $CF_3SO_3H$ and $CH_3SO_3H$ and, according to an even more advantageous embodiment, the acid D2 is methanesulfonic acid of formula $CH_3SO_3H$.

Preferably, the [inhibitor D1]/[acid D2] molar ratio is between 0.1 and 10 and preferably between 0.5 and 5.

It is advantageous for the [inhibitor D1]/[catalyst C] weight ratio to be between 30 and 2000 and for the [acid D2]/[catalyst C] molar ratio to be between 1 and 200.

Acetylenic alcohols D1 that are of use according to the invention can be chosen from the group consisting of the following compounds:
1-ethynyl-1-cyclohexanol, 2-methyl-3-butyn-2-ol, 3,7,11-trimethyl-1-dodecyn-3-ol, 3,5-dimethyl-1-hexyn-3-ol, 1-ethynyl-1-cyclopentanol, 3-methyl-1-dodecyn-3-ol, 1,1-diphenyl-2-propyn-1-ol, 3,6-diethyl-1-nonyn-3-ol, 3-methyl-1-pentadecyn-3-ol, 2,5-dimethyl-3-hexyne-2,5-diol, 2,7-dimethyl-3,5-octadiyne-2,7-diol, 3-methyl-1-pentyn-3-ol, 2,4,7,9-tetramethyl-5-decyne-4,7-diol, 1,4-bis(1'-hydroxycyclohexyl)-1,3-butadiyne, 1-(1-butynyl)-cyclopentanol, 2,5-dimethyl-5-hexen-3-yn-2-ol, 5-dimethylamino-2-methyl-3-pentyn-2-ol, 3,6-dimethyl-6-hepten-4-yn-3-ol, 3-methyl-1-octyn-3-ol, 3,4,4-trimethyl-1-pentyn-3-ol, 3-isobutyl-5-methyl-1-hexyn-3-ol, 2,5,8-trimethyl-1-nonen-3-yn-5-ol, 1-(1-propynyl)cyclohexanol, 3,4-dimethyl-1-pentyne-3,4-diol, 2,3,6,7-tetramethyl-4-octyne-3,6-diol and 4-ethyl-1-octyn-3-ol.

The catalyst C which is a hydrosilylation reaction catalyst is also well known. Use may in particular be made of platinum or complexes of platinum and of an organic product described in patents U.S. Pat. Nos. 3,159,601 and 3,220,972 and European patents EP-A-0 057 459, EP-A-0 188 978 and EP-A-0 190 530, and complexes of platinum and of vinyl-containing organosiloxanes described in patents U.S. Pat. Nos. 3,419,593, 3,715,334 and 3,814,730.

According to one variant of the invention, the proportions of the organopolysiloxane A and of the organohydropolysiloxane B are such that the molar ratio of the hydrogen atoms bonded to the silicon in the organohydropolysiloxane B to the alkenyl radicals bonded to the silicon in the organopolysiloxane A is between 0.4 and 10.

Advantageously, the organopolysiloxane A according to the invention exhibits:
at least two siloxyl units of formula (A.1):

$$T_a Z_b SiO_{4-(a+b)/2} \quad (A.1)$$

in which:
T is an alkenyl group,
Z is a monovalent hydrocarbon-based group, free of unfavorable action on the activity of the catalyst and chosen from the group consisting of alkyl groups having from 1 to 8 carbon atoms inclusive, optionally substituted with at least one halogen atom, and aryl groups, and
a is equal to 1 or 2, b is equal to 0, 1 or 2 and the sum a+b is between 1 and 3, and
optionally at least a portion of the other siloxyl units are units of formula (A.2):

$$Z_c SiO_{4-c/2} \quad (A.2)$$

in which:
Z has the same meaning as above and c is equal to 0, 1, 2 or 3.

Generally, the organopolysiloxane A has a viscosity at least equal to 100 mPa·s and preferably less than 200 000 mPa·s.

Advantageously, the organohydropolysiloxane B according to the invention exhibits:
at least two, and preferably at least three, siloxyl units of formula (B.1):

$$H_d L_e SiO_{4-(d+e)/2} \quad (B.1)$$

in which:
L is a monovalent hydrocarbon-based group, free of unfavorable action on the activity of the catalyst and chosen from the group consisting of alkyls having from 1 to 8 carbon atoms inclusive, optionally substituted with at least one halogen atom, and aryls,
H is a hydrogen atom, and
d is equal to 1 or 2, e is equal to 0, 1 or 2, and the sum d+e is equal to 1, 2 or 3, and
optionally, at least a portion of the other siloxyl units are units of formula (B.2):

$$L_g SiO_{4-g/2} \quad (B.2)$$

in which:
L has the same meaning as above and g is equal to 0, 1, 2 or 3.

Generally, the dynamic viscosity of the organohydro-polysiloxane B is at least equal to 10 mPa·s and it is preferably between 20 and 1000 mPa·s.

Advantageously, the proportions of the siloxyl units (A.1) and (B.1) are such that the molar ratio of the hydrogen atoms bonded to the silicon in the organo-hydropolysiloxane B to the alkenyl radicals bonded to the silicon in the organopolysiloxane A is between 0.4 and 10.

According to one variant of the invention, the silicone composition X according to the invention may comprise one or more additives which are conventional in the field of silicone non-stick coatings for a solid support, for example made of paper. The additive may, for example, be an antimisting additive, such as silica particles, or branched polyorganosiloxanes, etc.

According to one variant, the silicone composition X according to the invention may also comprise an adhesion-modulating system and also additives that are normal in this type of application, such as: bactericides, antifreezes, wetting agents, antifoams, fillers, synthetic latexes or colorants.

According to another of its aspects, the present invention relates to a silicone elastomer Y obtained by crosslinking or curing the silicone composition X according to the invention and as described above, said crosslinking or curing being carried out at a temperature of between 70° C. and 200° C.

The present invention also relates to the use of the silicone composition X according to the invention as a coating base for the production of non-stick and water-repellant crosslinked elastomer coatings on a solid support, preferably a flexible solid support, such as a paper, a cardboard, a cellulose sheet, a metal sheet or a plastic film.

Another subject of the invention consists of a solid support at least partially coated using the silicone composition X according to the invention and as described above, and crosslinked or cured by heating at a temperature of between 70° C. and 200° C., or the silicone elastomer Y according to the invention and as described above.

The invention also relates to a hydrosilylation reaction inhibitor D which is capable of being obtained by mixing:
- at least one inhibitor D1 according to the invention and as described above which is an acetylenic alcohol and preferably an α-acetylenic alcohol, and
- at least one acid D2 which has, in aqueous solution and at 25° C., at least a pKa<−0.9, preferably ≤−1.0 and even more preferentially included in the following range −12.0≤pKa≤−1.0.

Another subject of the invention consists of the use of the hydrosilylation reaction inhibitor D according to the invention and as described above, in curable or crosslinkable silicone compositions comprising:
(1) at least one organopolysiloxane A comprising, per molecule, at least two alkenyl radicals bonded to silicon atoms,
(2) at least one organohydropolysiloxane B comprising, per molecule, at least two hydrogen atoms bonded to silicon atoms, and
(3) at least one catalyst C which is a platinum compound and even more preferentially a Karstedt platinum and the amount by weight of platinum of the catalyst C relative to the total weight of the silicone composition X is less than 50 ppm and preferably between 1 and 40 ppm and even more preferentially between 5 and 25 ppm.

Finally, the present invention relates to a process for making flexible sheets of material non-adherent to surfaces to which they normally adhere, characterized in that it consists in applying an amount of the silicone composition X according to the invention and as described above of between 0.1 and 5 g per m² of area to be coated and then in crosslinking the composition by heating at a temperature of between 70° C. and 200° C.

The silicone composition X according to the invention can be applied by means of devices used on industrial machines for coating paper, such as a five-roll coating head, air knife systems or equalizing bar systems, to flexible supports or materials and then cured by moving through tunnel ovens heated to 70-200° C.; the passage time through these ovens depends on the temperature; it is generally from 5 to 15 seconds at a temperature of 100° C. and from 1.5 to 3 seconds at a temperature of 180° C.

The silicone composition X can be deposited on any flexible material or substrate, such as paper of various types (supercalendered, coated, glassine), cardboard, cellulose sheets, metal sheets, plastic films (polyester, polyethylene, polypropylene, etc.), etc.

The amounts of compositions deposited are generally of the order of 0.1 to 5 g per m² of area to be treated, which corresponds to the deposition of layers of the order of 0.1 to 5 µm.

The materials or supports thus coated can subsequently be brought into contact with any pressure-sensitive rubber, acrylic or other adhesive materials. The adhesive material is then easily detachable from said support or material.

All the viscosities concerned with in the present report correspond to a dynamic viscosity quantity which is measured, in a manner known per se, at 25° C.

In the continuation of the present application, the polyorganosiloxane oils will be described in a conventional way using the normal notation, in which the letters M, D, T and Q are used to denote various siloxyl units. In this notation, the silicon atom of a siloxyl unit is involved in one (M), two (D), three (T) or four (Q) covalent bonds with as many oxygen atoms. When an oxygen atom is shared between two silicon atoms, it is counted as M and it will not be mentioned in an abbreviated formula. On the other hand, if the oxygen atom belongs to an alkoxyl or hydroxyl group bonded to a silicon atom, this chemical function will be indicated between parentheses in the abbreviated formula. By default, it is considered that the remaining bonds of the silicon atom are connected to a carbon atom. Generally, the hydrocarbon-based groups bonded to the silicon via a C—Si bond are not mentioned and most commonly correspond to an alkyl group, for example a methyl group. When a hydrocarbon-based group has a specific function, it is indicated in superscript. For example, the abbreviated formulae:

$M^{vi}$ represents a unit in which the silicon atom is bonded to an oxygen atom and one of the hydrocarbon-based groups of which forming a C—Si bond is a vinyl group, i.e. a dialkylvinylsiloxyl unit, and M' represents a unit in which the silicon atom is bonded to a hydrogen atom, to an atom and to two methyl groups.

By way of reference handbook, mention may be made of: Noll, "*Chemistry and technology of silicones*", chapter 1.1, pages 1-9, Academic Press, 1968-2nd edition.

The nonlimiting examples which follow will make it possible to understand the invention more clearly and to grasp therefrom all its advantages and embodiment variants.

EXAMPLES

Products Used

The pKa values are those measured in aqueous solution at 25° C.

polydimethylsiloxane oil containing vinyl at the chain end (A.2): of mean formula $M^{vi}D_{110}D^{vi}M^{vi}$.

Polymethylhydrosiloxane oils (B.2): mixture: 18% by weight of an oil of mean formula $M_{1.4}D'_{14}D_{21}M_{0.6}$ + 82% of a polymethylhydrosiloxane oil of structure $MD'_{40}M$.

Catalyst (C): Karstedt Pt containing 2800 ppm of Pt.

Inhibitor: (D1.I1): 1-ethynyl-1-cyclohexanol (ECH).

Comparative Acid

Heptanoic acid (D2.C1): $CH_3(CH_2)_5COOH$, (pKI=4.89).

Orthophosphoric acid (D2.C2): ($H_3PO_4$) (pKI=2.15).

Acids According to the Invention:

Methanesulfonic acid (D2.I1): (pKI=−1.9).

Example 1

The inhibitor ECH (D1.I1) is added beforehand to the vinyl-containing polydimethylsiloxane oil (A.1). After homogenization of the mixture, the polymethylhydro-siloxane oil (B.1), then the amount of acid to be tested and, finally, the catalyst (C) are then introduced. The time required for crosslinking at ambient temperature (25° C.) and at 40° C. is measured and is the bath life at 25° C. and at 40° C. The results are recorded in the following table 1.

TABLE 1

|  | Comparative composition (C-1) | Comparative composition (C-2) | Comparative composition (C-3) | Comparative composition (C-4) | Comparative composition (C-5) |
|---|---|---|---|---|---|
| Vinyl-containing polydimethylsiloxane oil (A.2) [g] | 100 | 100 | 100 | 100 | 100 |
| Polymethylhydrosiloxane oil (B.2) [g] | 7.5 | 7.5 | 7.5 | 7.5 | 7.5 |
| Catalyst (C) (ppm of Pt, weight/total weight of the composition) | 50 | 50 | 50 | 50 | 50 |
| Inhibitor ECH (D1.I1) (ppm, weight/total weight of the composition) | 1500 | 1500 | 1500 | 1500 | 1500 |
| Acid (D2.I1) (ppm, weight/total weight of the composition) | 200 | 300 | 400 | 500 | 1000 |
| Bath life at 25° C. | — | — | 2 h 30 min | 3 h | 1 h 15 min |
| Bath life at 40° C. | <1 h | <1 h | 1 h | 1 h | 30 min |

[H/Vinyl] molar ratio = 1.8

It is noted that, when the amount of platinum catalyst is 50 ppm relative to the total weight of the composition, the presence of variable amounts of methanesulfonic acid (D2.I1) does not make it possible to obtain a satisfactory bath life, especially at 40° C.

Example 2

The inhibitor ECH (D1.I1) is added beforehand to the vinyl-containing polydimethylsiloxane oil (A.1). After homogenization of the mixture, the polymethylhydro-siloxane oil (B.1) and then a fixed amount of 500 ppm (relative to the total weight of the composition) of the acid to be tested and, finally, a variable amount of the catalyst (C) are then introduced. The time required for crosslinking at ambient temperature (25° C.) and at 40° C. is measured and is the bath life at 25° C. and at 40° C. The results are recorded in the following table 2.

TABLE 2

|  | Comparative composition (C-4) | Invention composition (I-1) | Invention composition (I-2) | Invention composition (I-3) |
|---|---|---|---|---|
| Vinyl-containing polydimethylsiloxane oil (A.2) [g] | 100 | 100 | 100 | 100 |
| Polymethylhydrosiloxane oil (B.2) [g] | 7.5 | 7.5 | 7.5 | 7.5 |
| Catalyst (C) (ppm of Pt, weight/total weight of the composition) | 50 | 20 | 15 | 10 |
| Inhibitor ECH (D1.I1) (ppm, weight/total weight of the composition) | 1500 | 1500 | 1500 | 1500 |
| Acid (D2.I1) (ppm, weight/total weight of the composition) | 500 | 500 | 500 | 500 |
| Bath life at 25° C. | 3 h | 24 h | 24 h | 24 h |
| Bath life at 40° C. | 1 h | 4 h | 4 h 30 | 6 h 30 |

[H/Vinyl] molar ratio = 1.8

It is noted that the tests according to the invention (amount by weight of platinum less than 50 ppm relative to the total weight of the composition) make it possible to obtain very good bath lives at 25° C. which are of the order of 24 h instead of 3 h. At 40° C., the improvement in the compositions according to the invention is of the order of 400% to 650%.

Example 3

The inhibitor ECH (D1.I1) is added beforehand to the vinyl-containing polydimethylsiloxane oil (A.1). After homogenization of the mixture, the polymethylhydro-siloxane oil (B.1) and then the acid to be tested are then introduced and, finally, the amount of catalyst (C) is fixed at 10 ppm of platinum relative to the total weight of the composition. The formulations are recorded in the following table 3:

TABLE 3

|  | Comparative composition (C-5) | Comparative composition (C-6) | Comparative composition (C-7) | Invention composition (I-3) |
|---|---|---|---|---|
| Vinyl-containing polydimethylsiloxane oil (A.2) [g] | 100 | 100 | 100 | 100 |
| Polymethylhydrosiloxane oil (B.2) [g] | 7.5 | 7.5 | 7.5 | 7.5 |
| Catalyst (C) (ppm of Pt, weight/total weight of the composition) | 10 | 10 | 10 | 10 |

TABLE 3-continued

| | Comparative composition (C-5) | Comparative composition (C-6) | Comparative composition (C-7) | Invention composition (I-3) |
|---|---|---|---|---|
| Inhibitor ECH (D1.I1) (ppm, weight/total weight of the composition) | 1500 | 1500 | 1500 | 1500 |
| Acid (D2.I1) (ppm, weight/total weight of the composition) | 0 | 0 | 0 | 500 |
| Acid (D2.C1) (ppm, weight/total weight of the composition) | 0 | 0 | 500 | 0 |
| Acid (D2.C2) (ppm, weight/total weight of the composition) | 0 | 500 | 0 | 0 |

A sample for each composition is taken and analyzed by DSC (Differential Scanning calorimetry, device of Metler type). The analysis is carried out in an aluminum pan using a temperature gradient from 25° C. to 250° C. at a rate of 10° C./min. This technique makes it possible to measure, for each composition, the peak start temperature (onset of the crosslinking reaction) or "T° C. onset", the peak summit temperature ("T° C. peak") and the peak end temperature ("T° C. endset").

The thermal profiles, the data characteristic of the exothermic peaks (T° C. onset, T° C. peak and T° C. endset) are represented in the following table 4.

TABLE 4

| | Results by DSC analysis | | | |
|---|---|---|---|---|
| | deltaH (J/g) | T° C. onset | T° C. peak | T° C. endset |
| Comparative composition (C-5) | 42.03 | 126.3 | 130.2 | 132.5 |
| Comparative composition (C-6) | 41.94 | 119.8 | 125.1 | 130.1 |
| Comparative composition (C-7) | 39.22 | 126.2 | 130.1 | 132.4 |
| Invention composition (I-3) | 39.40 | 109.3 | 114.9 | 120.0 |

It is noted that, when the compositions contain a low weight of platinum (10 ppm relative to the total weight of the composition), the lifting of inhibition is much faster in the case of the invention [composition (I-3)=with 500 ppm of methanesulfonic acid, the crosslinking reaction starts at 109.3° C.] than for the comparative examples, namely the compositions:
  (C-5)=without acid, with 10 ppm of platinum, the crosslinking reaction starts at 126.3° C.,
  (C-6)=with 500 ppm of orthophosphoric acid+10 ppm of platinum, the crosslinking reaction starts at 119.8° C., and
  (C-7)=with 500 ppm of heptanoic acid+10 ppm of platinum, the crosslinking reaction starts at 126.2° C.

The invention claimed is:

1. A silicone composition X capable of curing by means of a polyaddition reaction, the composition comprising:
  (1) at least one organopolysiloxane A comprising, per molecule, at least two alkenyl radicals bonded to silicon atoms,
  (2) at least one organohydropolysiloxane B comprising, per molecule, at least two hydrogen atoms bonded to silicon atoms,
  (3) at least one catalyst C which is a platinum compound in which the amount by weight of platinum of the catalyst C relative to the total weight of the silicone composition X is less than 50 ppm,
  (4) at least one inhibitor D which is capable of being obtained by mixing, optionally in situ:
    at least one inhibitor D1 which is an acetylenic alcohol, and
    at least one acid D2 which has, in aqueous solution and at 25° C., at least a pKa<−0.9,
    said constituents D1 and D2 being initially present in said silicone composition X in amounts sufficient to:
    maintain the inhibition of the catalyst C so as to prevent the formation of a gel or of an elastomer when said silicone composition X is stored at ambient temperature, and
    allow the partial or complete degradation of said acetylenic alcohol D1 by chemical reaction between the inhibitor D1 and the acid D2 when the silicone composition X is cured by heating at a temperature between 70° C. and 200° C.

2. The silicone composition X as claimed in claim 1, wherein the [inhibitor D1]/[acid D2] molar ratio is between 0.1 and 10.

3. The silicone composition X as claimed in claim 1, wherein the [inhibitor D1]/[catalyst C] weight ratio is between 30 and 2000 and the [acid D2]/[catalyst C] molar ratio is between 1 and 200.

4. The silicone composition X as claimed in claim 1, wherein the acetylenic alcohol D1 is selected from the group consisting of the following compounds:
1-ethynyl-1-cyclohexanol, 2-methyl-3-butyn-2-ol, 3,7,11-trimethyl-1-dodecyn-3-ol, 3,5-dimethyl-1-hexyn-3-ol, 1-ethynyl-1-cyclopentanol, 3-methyl-1-dodecyn-3-ol, 1,1-diphenyl-2-propyn-1-ol, 3,6-diethyl-1-nonyn-3-ol, 3-methyl-1-pentaderyn-3-ol, 2,5-dimethyl-3-hexyne-2,5-diol, 2,7-dimethyl-3,5-octadiyne-2,7-diol, 3-methyl-1-pentyn-3-ol, 2,4,7,9-tetramethyl-5-decyne-4,7-diol, 1,4-bis(1'-hydroxycyclohexyl)-1,3-butadiyne, 1-(1-butyny)cyclopentanol, 2,5-dimethyl-5-hexen-3-yn-2-ol, 5-dimethylamino-2-methyl-3-pentyn-2-ol, 3,6-dimethyl-6-hepten-4-yn-3-ol, 3-methyl-1-octyn-3-ol, 3,4,4-trimethyl-1-pentyn-3-ol, 3-isobutyl-5-methyl-1-hexyn-3-ol, 2,5,8-trimethyl-1-nonen-3-yn-5-ol, 1-(1-propynyl)cyclohexanol, 3,4-dimethyl-1-pentyne-3,4-diol, 2,3,6,7-tetramethyl-4-octyne-3,6-diol and 4-ethyl-1-octyn-3-ol.

5. The silicone composition X as claimed in claim 1, wherein the acid D2 is methanesulfonic acid of formula $CH_3SO_3H$.

6. The silicone composition X as claimed in claim 1, wherein the proportions of the organopolysiloxane A and of the organohydropolysiloxane B are such that the molar ratio of the hydrogen atoms bonded to the silicon in the organohydropolysiloxane B to the aikenyl radicals bonded to the silicon in the organopolysiloxane A is between 0.4 and 10.

7. A silicone elastomer Y obtained by crosslinking or curing the silicone composition X as claimed in claim 1, said crosslinking or curing being carried out at a temperature of between 70° C. and 200° C.

8. A method of preparing a coating base, the method comprising preparing the coating base using the silicone composition X as claimed in claim 1, for the production of non-stick and water-repellant crosslinked elastomer coatings on a solid support.

9. A solid support at least partially coated using the silicone composition X as claimed in claim 1, wherein the composition is crosslinked or cured by heating at a temperature of between 70° C. and 200° C.

10. A curable or crosslinkable silicone composition comprising:
  (1) a hydrosilylation reaction inhibitor D, obtained by mixing at least one inhibitor D1 which is an acetylenic alcohol and at least one acid D2 which has, in aqueous solution at 25° C., at least a pKa<−0.9,
  (2) at least one organopolysiloxane A comprising, per molecule, at least two alkenyl radicals bonded to silicon atoms,
  (3) at least one organohydropolysiloxane B comprising, per molecule, at least two hydrogen atoms bonded to silicon atoms, and
  (4) at least one catalyst C which is a platinum compound wherein the amount by weight of platinum of the catalyst C relative to the total weight of the silicone composition X is less than 50.

11. A method for making flexible sheets of material non-adherent to surfaces to which they normally adhere, wherein the method comprises applying an amount of the silicone composition X as claimed in claim 1 of between 0.1 g and 5 g per $m^2$ of area to be coated and then crosslinking the composition by heating at a temperature of between 70° C. and 200° C.

12. The silicone composition X as claimed in claim 1, wherein the amount by weight of platinum of the catalyst C relative to the total weight of the silicone composition X is between 1 ppm and 40 ppm.

13. The silicone composition X as claimed in claim 1, wherein the amount by weight of platinum of the catalyst C relative to the total weight of the silicone composition X is between 5 ppm and 25 ppm.

14. The silicone composition X as claimed in claim 1, wherein the at least one inhibitor D1 is an α-acetylenic alcohol.

15. The silicone composition X as claimed in claim 1, wherein the at least one acid D2 has, in aqueous solution and at 25° C., at least a pKa≤−1.0.

16. The silicone composition X as claimed in claim 1, wherein the at least one acid D2 has, in aqueous solution and at 25° C., at least a pKa included in the following range −12.0≤pKa≤−1.0.

17. The silicone composition X as claimed in claim 1, wherein the [inhibitor D1]/[acid D2] molar ratio is between 0.5 and 5.

18. The method as claimed in claim 8, wherein the solid support is a flexible solid support.

19. The silicone composition as claimed in claim 10, wherein the at least one inhibitor D1 is an α-acetylenic alcohol.

20. The silicone composition as claimed in claim 10, wherein the at least one acid D2 has, in aqueous solution at 25° C., at least a pKa≤−1.0.

21. The silicone composition as claimed in claim 10, wherein the at least one acid D2 has, in aqueous solution at 25° C., at least a pKa included in the following range −12.0≤pKa≤−1.0.

22. The silicone composition as claimed claim 10, wherein the at least one catalyst C is a Karstedt platinum.

23. The silicone composition as claimed in claim 10, wherein the amount by weight of platinum of the catalyst C relative to the total weight of the silicone composition X is between 1 ppm and 40 ppm.

24. The silicone composition as claimed in claim 10, wherein the amount by weight of platinum of the catalyst C relative to the total weight of the silicone composition X is between 5 ppm and 25 ppm.

25. The silicone composition as claimed in claim 1, wherein the platinum compound is a Karstedt platinum.

26. The method of claim 19, wherein the flexible solid support is a paper, a cardboard, a cellulose sheet, a metal sheet or a plastic film.

27. A method of preparing the silicone composition of claim 1, wherein the method comprises
  preparing a hydrosilylation reaction inhibitor D by mixing an inhibitor D1 which is an acetylenic alcohol with an acid D2 which has, in aqueous solution at 25° C., at least a pKa<−0.9, to obtain at least one inhibitor D, and
  mixing
  (1) at least one organopolysiloxane A comprising, per molecule, at least two alkenyl radicals bonded to silicon atoms,
  (2) at least one organohydropolysiloxane B comprising, per molecule, at least two hydrogen atoms bonded to silicon atoms,
  (3) at least one catalyst C which is a platinum compound in which the amount by weight of platinum of the catalyst C relative to the total weight of the silicone composition X is less than 50 ppm, and
  (4) at least one inhibitor D.

* * * * *